US008709217B2

(12) United States Patent
Krishna et al.

(10) Patent No.: US 8,709,217 B2
(45) Date of Patent: Apr. 29, 2014

(54) PRODUCTION OF CARBON NANOSTRUCTURES FROM FUNCTIONALIZED FULLERENES

(75) Inventors: Vijay Krishna, Gainesville, FL (US); Brij M. Moudgil, Gainesville, FL (US); Benjamin L. Koopman, Gainesville, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 267 days.

(21) Appl. No.: 13/128,585

(22) PCT Filed: Nov. 9, 2009

(86) PCT No.: PCT/US2009/063710
§ 371 (c)(1), (2), (4) Date: Jul. 12, 2011

(87) PCT Pub. No.: WO2010/054301
PCT Pub. Date: May 14, 2010

(65) Prior Publication Data
US 2011/0262340 A1    Oct. 27, 2011

Related U.S. Application Data

(60) Provisional application No. 61/112,860, filed on Nov. 10, 2008.

(51) Int. Cl.
*C01B 31/00* (2006.01)
*B01J 19/12* (2006.01)
*B82Y 99/00* (2011.01)
*B82Y 40/00* (2011.01)
*B82Y 30/00* (2011.01)

(52) U.S. Cl.
USPC .............. 204/157.47; 204/157.4; 204/157.41; 423/445 B; 423/447.1; 423/445 R; 977/902; 977/842; 977/752

(58) Field of Classification Search
USPC ......... 204/157.4, 157.41, 157.47; 423/445 B, 423/445 R; 977/752, 902, 842
See application file for complete search history.

(56) References Cited

U.S. PATENT DOCUMENTS 5,370,855 A * 12/1994 Gruen ........................... 423/446
(Continued)

FOREIGN PATENT DOCUMENTS

JP    10-273308    10/1998

OTHER PUBLICATIONS

Bandow, S. et al., "Raman scattering study of double-wall carbon nanotubes derived from the chains of fullerenes in single-wall carbon nanotubes," *Chemical Physics Letters*, Mar. 30, 2001, pp. 48-54, vol. 337.
Kramberger, C. et al., "Tailoring carbon nanostructures via temperature and laser irradiation," *Chemical Physics Letters*, 2005, pp. 254-259, vol. 407.

(Continued)

*Primary Examiner* — Daniel C McCracken
(74) *Attorney, Agent, or Firm* — Saliwanchik, Lloyd & Eisenschenk

(57) ABSTRACT

Electromagnetic irradiation of functionalized fullerenes in an oxygen-free environment induces conversion of the functionalized fullerenes to carbon nanotubes, carbon nanohorns, carbon onions, diamonds and/or carbon schwarzites. The carbon nanotubes can be multi-wall carbon nanotubes. Advantageously, the subject invention can be used for in-situ synthesis of carbon nanostructures within a matrix to form a carbon nanostructure composite, where positioning of the carbon nanostructures is controlled by the manner of dispersion of the functionalized fullerenes in the matrix. Carbon nanotube comprising features, such as electrical connects, can be formed on a surface by irradiating a portion of a functionalized fullerene coating with a laser beam.

11 Claims, 4 Drawing Sheets

(56) References Cited

U.S. PATENT DOCUMENTS

| | | | |
|---|---|---|---|
| 5,591,312 A * | 1/1997 | Smalley | 204/157.41 |
| 5,773,834 A | 6/1998 | Yamamoto et al. | |
| 6,290,753 B1 * | 9/2001 | Maeland et al. | 95/116 |
| 6,855,659 B1 | 2/2005 | Zhang | |
| 6,960,334 B1 | 11/2005 | Matsui et al. | |
| 2006/0241236 A1 | 10/2006 | Kuznetsov et al. | |

OTHER PUBLICATIONS

Manfredini, M. et al., "Raman scattering characterization of amorphous carbon from photothermal oxidation of fullerite," *J. Appl. Phys.*, Nov. 15, 1995, pp. 5945-5952, vol. 78, No. 10.

Milani, P. et al., "Laser-Induced Coalescence of $C_{60}$ in the Solid State," *J. Phys. Chem.*, 1995, pp. 16119-16120, vol. 99.

Spadoni, S. et al., "Routes to carbon schwarzites from fullerene fragments," *Europhysics Letters*, 1997, pp. 269-274, vol. 39, No. 3.

* cited by examiner

PRODUCTION OF CARBON NANOSTRUCTURES FROM FUNCTIONALIZED FULLERENES

CROSS-REFERENCE TO RELATED APPLICATIONS

This application is the U.S. national stage application of International Patent Application No. PCT/US2009/063710, filed Nov. 9, 2009, which claims the benefit of U.S. Provisional Application Ser. No. 61/112,860, filed Nov. 10, 2008, the disclosures of which are hereby incorporated by reference in their entireties, including all figures, tables and drawings.

BACKGROUND OF THE INVENTION

Carbon nanotubes (CNTs) can be synthesized by various techniques such as arc-discharge, laser ablation, chemical vapor deposition (CVD) and templated synthesis. The arc-discharge and laser ablation methods usually use graphite as the source of carbon while CVD and templated synthesis use carbon monoxide or hydrocarbons as the source. CNTs have been synthesized by thermal or laser treatment of carbon nanostructures that undergo structure rearrangement and/or coalescence. Single-walled carbon nanotubes (SWNTs) and double-walled carbon nanotubes (DWNTs) have been synthesized by thermolysis or laser irradiation of pristine fullerenes (free of non-carbon substituents).

The common starting materials, such as graphite and fullerenes, limit the mode of synthesis. A starting material that is readily dispersible in various environments could allow additional processing methods and structured materials. For example, in-situ synthesis of carbon nanostructures in a matrix or within other environments could extend the uses for carbon nanostructures.

BRIEF SUMMARY OF THE INVENTION

Embodiments of the invention are directed to a method of producing carbon nanostructures, comprising the steps of providing functionalized fullerenes and irradiating the functionalized fullerenes with electromagnetic radiation in an oxygen-free environment to convert the functionalized fullerenes into carbon nanotubes, carbon nanohorns, carbon onions, diamonds, and/or carbon schwarzites. For example, the carbon nanotubes can be single-wall carbon nanotubes, multi-wall carbon nanotubes or nanotubes can be formed that are welded together.

The electromagnetic radiation can be of a wavelength of $10^{-12}$ to $10^{12}$ m, which include gamma rays, x-rays, extreme ultraviolet, ultraviolet, visible, infrared, microwave, and radio wave. In some embodiments coherent or incoherent light can be used. Focused light can be used including that of a laser beam.

The oxygen-free environment can be any non-oxidizing environment such as a non-oxidizing gas, a vacuum, or within an oxygen free matrix which acts as a barrier to diffusion of oxygen to the functionalized fullerenes. The matrix can be any organic solid, inorganic solid, polymer, polymer composite, metal, metal alloy, glass, ceramic, or any combination thereof. The functionalized fullerenes can be fullerenes ($C_x$ where x is 20 to 1500) with side groups attached to the fullerene by covalent bonds, ionic bonds, or Dewar coordination, Kubas interactions, or any combination thereof. Useful side groups include, but are not restricted to, OH, Br, $H_2$, Gd, Ti, or $C(COOH)_2$ groups. Depending upon the non-oxidizing environment and the side groups, carbon nanostructures that include elements other than carbon can be produced.

In an embodiment of the invention, a connect between electrical components can be constructed by coating a substrate that includes a plurality of electrical components with functionalized fullerenes in a solvent, removing the solvent to form a coating comprising functionalized fullerenes, irradiating a portion of the coating between electrical components in an oxygen-free environment with a laser beam to form the connect comprising carbon nanotubes where irradiated by the laser beam, and removing any non-irradiated (unreacted) functionalized fullerenes. The removal of unreacted functionalized fullerenes can be carried out by washing with a solvent or by additionally irradiating the unreacted functionalized fullerenes, but in an oxygen-rich environment, such as air, to combust the functionalized fullerenes.

In another embodiment of the invention, a carbon nanotube composite can be formed by irradiating a matrix with included functionalized fullerenes to convert the functionalized fullerenes to carbon nanotubes within the matrix. The matrix can be a polymer, copolymer, glass or metal. The carbon nanotubes can be inhomogeneously dispersed in the carbon nanotubes composite dispersion by inhomogeneously dispersing the functionalized fullerenes in the matrix before irradiation. For example the matrix can be an inhomogeneous material having a plurality of phases where the functionalized fullerenes are segregated into one of the phases in the matrix.

DETAILED DESCRIPTION OF THE INVENTION

Figure 1:
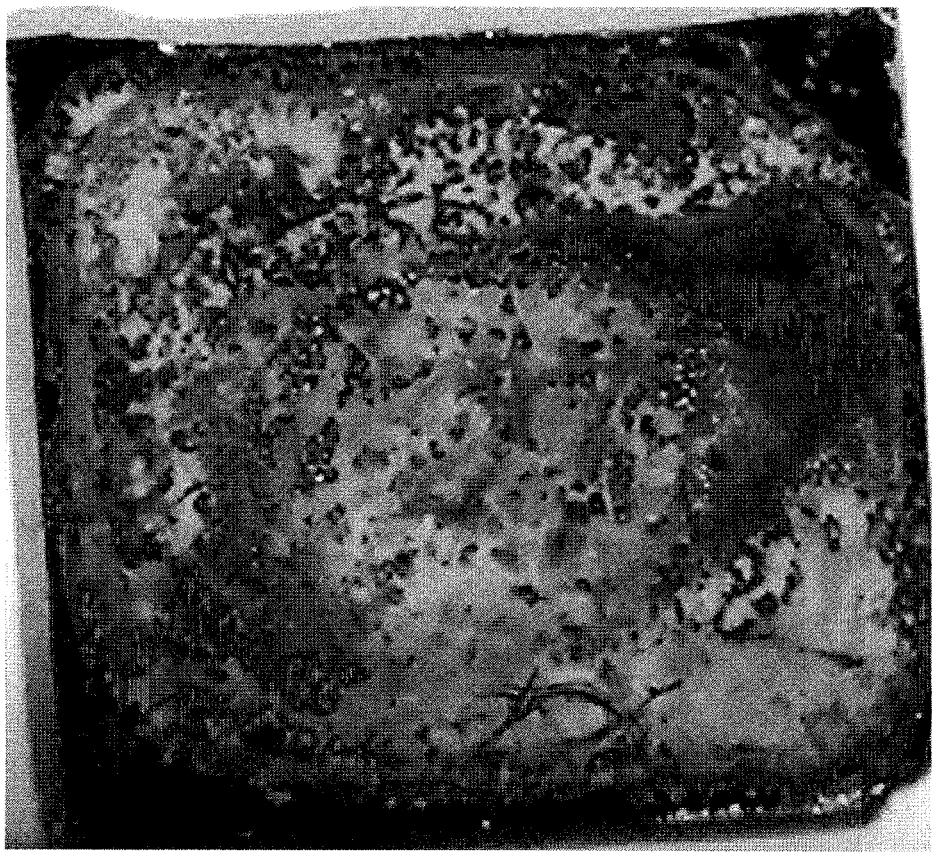
FIG. 1 shows optical image of polyhydroxy fullerene film on silica wafer after laser irradiation.

One embodiment of the invention is directed to a method for producing carbon nanostructures by electromagnetic irradiation of functionalized fullerenes. When irradiated in an oxygen-free environment, functionalized fullerenes undergo molecular reconstruction to form other carbon nanostructures. The radiation can be from any portion of the electromagnetic spectrum, from $10^{-12}$ to $10^{12}$ m in wavelength, which includes gamma rays, x-rays, extreme ultraviolet, ultraviolet, visible, infrared, microwave, radio wave, or any combination thereof. The irradiation source can be a laser beam. In other embodiments of the invention the radiation source can be an incoherent source. Because oxygen or other oxidizers combust or otherwise oxidatively decompose the functionalized fullerenes, the irradiation step must be performed in an oxygen-free environment. It should be understood that oxygen is an equivalent to other oxidizing agents and, therefore, oxygen-free environment can alternately, or additionally, require absence of any other oxidizing agent. The oxygen-free environment can be established through any physical and/or chemical technique. In one embodiment, the oxygen-free environment can be a vacuum. In another embodiment, the oxygen-free environment can be a non-oxidizing gas (e.g., nitrogen, argon) atmosphere.

For the purpose of this invention, the term "fullerenes" is used to define a general class of molecules that exists essentially in the shape of a three dimensional polyhedron containing from 20 to 1500 carbon atoms, and which comprises carbon atoms as the predominant element from which they are composed. The fullerenes include but are not limited to C-28, C-32, C-44, C-50, C-58, C-60, C-70, C-84, C-94, C-250 and C-540. (According to this nomenclature, the fullerene which contains 60 carbon atoms is denoted C-60, the fullerene which contains 70 carbon atoms is denoted C-70, etc.) Also included among the fullerenes for purposes of the invention are the substituted fullerenes. These are molecular fullerenes which have had one or more of the atoms which comprise the fullerene cage structure replaced by an atom other than carbon, such as nitrogen, boron or titanium, yet essentially retain the geometry of a polyhedron upon being so substituted. Also included among the fullerenes are endohedral fullerenes, in which atoms of elements other than carbon (e.g., iron) reside inside the cage structure. Functionalized fullerenes refer to fullerenes ($C_x$ where x is 20 to 1500) with side groups attached to the outer surface of the cage via covalent bonds, ionic bonds, or Dewar coordination, or Kubas interactions, or any combination thereof. The side groups can be either inorganic, including, but not exclusive to, OH, Br, $H_2$, Gd, Ti, organic, including, but not exclusive to, $C(COOH)_2$, or any combination of organic and/or inorganic functional groups. The number of functional groups attached per cage of fullerene can vary from 1 to a majority of the number of carbons in the fullerene cage. Functionalized fullerenes have different physical and chemical properties based on the type and number of side groups. The functionalized fullerenes, which are formally molecules, have dimensions that are in excess of a nanometer in diameter and as such constitute nanoparticles.

The irradiation of functionalized fullerenes can lead to formation of different carbon nanostructures. In several embodiments, carbon nanotubes, carbon nanohorns, carbon onions, diamonds and/or carbon schwarzites are formed. Multi-wall carbon nanotubes (MWNTs) can be prepared according to an embodiment of the invention. In another embodiment of the invention, single-wall nanotubes can be prepared. The carbon nanostructures can be elaborated into superstructures, for example, they can be welded together. The carbon nanostructures can contain desirable elements, carbon isotopes or side groups depending upon the functionalized fullerenes employed and other conditions of the transformation including irradiation source, irradiation intensity, additives to the fullerenes and physical conditions under which the transformation is carried out. The intensity of the irradiation can vary as needed to achieve a desired carbon nanostructure.

The functionalized fullerenes can be delivered by carriers or embedded in matrices. The functionalized fullerenes can be carried or encapsulated in a carrier/matrix or attached to the carrier's/matrix's surface. The matrix can not only secure but can be used to orient the functionalized fullerenes. The carrier/matrix herein can be an organic gas, liquid or solid; an inorganic gas, liquid or solid; a polymer or polymer composite; a metal or metal alloy; a glass or ceramic; a biological or biologically derived material; or any combination thereof. For example, doped CNTs can be a hydrogen storage material where formation of the doped CNTs can be carried out using a carrier of hydrogen gas. Irradiation of the functionalized fullerenes in a hydrogen atmosphere can result in the trapping of hydrogen gas by a MWNT. Hence, a hydrogen storage material comprising carbon nanotubes can be synthesized from functionalized fullerenes in a hydrogen atmosphere upon electromagnetic radiation.

Methods according to embodiments of the invention are advantageous because the in-situ generation of carbon nanostructures and derivatives thereof with specific desired performance can be formed in various manners. For example but not limited to: carbon nanotube reinforced polymers; aligned carbon nanotubes with controlled length and number of walls; catalyst-free synthesis; and welding of nanotubes. Upon dispersion of the functionalized fullerenes, the irradiation can be carried out to form carbon nanotubes within the matrix. The matrix can be a polymer, glass, metal or other material that allows projection of the radiation to the functionalized fullerenes. The functionalized fullerenes can be homogeneously or inhomogeneously dispersed in the matrix. The functionalized fullerenes can be included such that a percolation threshold is met or exceeded such that dimensions of the resulting nanotubes are not limited by matrix isolation of functionalized fullerenes. The matrix can be of two discontinuous materials, such as a blend or structured composite or copolymer, for example a block copolymer, where the functionalized fullerenes segregate to one of the two discontinuous materials.

In another embodiment, the carrier can comprise an appropriate solvent. The functionalized fullerenes can be dissolved or dispersed in the solvent. It is known to those skilled in the art that because of the nanoscale size of functionalized fullerenes, as well as their solubility in polar and non-polar solvents, the terms such as "dissolve," "disperse" and "suspend" can be interchangeable herein, as can be "solution," "dispersion" and "suspension," as in some cases where it is not readily apparent for the liquid phase employed if a true solution or a suspension is formed. In some embodiments of the invention, as is obvious to one skilled in the art, a solution and suspension are distinct entities.

The carriers or matrices can include chemicals or particles other than functionalized fullerenes. These chemicals or particles can specifically interact with the functionalized fullerenes or can have no specific interaction with the functionalized fullerenes and be included for other functions in the system that is formed. The chemicals or particles may be proteins, contrast agents such as dyes, Gadolinium chelates, or particles including gold, silica, iron oxide and titania.

The in-situ synthesis of carbon nanostructures such as CNTs can result in novel materials for various applications. In one embodiment, elements or isotopes that impart novel capabilities (e.g., detection, therapeutics) can be incorporated within the core or walls of CNTs using functionalized fullerenes that contain these elements or isotopes. The CNTs synthesized in this fashion could be used, for example, as sensors for detection of biological or chemical agents. In another embodiment of the invention, irradiation of $Gd@C_{60}$ $(OH)_x$ (Hydroxylated fullerenes with gadolinium atoms inside the cage) in an oxygen-free environment produces Gd doped CNTs, which can be used as contrast agents for magnetic resonance imaging (MRI). Modified CNTs could also be applied for therapeutic properties such as drug delivery.

CNTs can be used in various electronic devices, including electrical connects, field emission devices and displays. One of the major hurdles for successful application of CNTs in these areas is the poor dispersability of CNTs and the presence of impurities such as metal catalysts in CNTs. These barriers to incorporation of CNTs in such devices can be overcome by employing in-situ synthesis of CNTs from functionalized fullerenes. In one embodiment, the subject invention involves a method of forming a connect between electrical components, comprising coating the connect area with a material comprising functionalized fullerenes in a solvent and scanning the area with a laser source in an oxygen-free environment to form the connect. The functionalized fullerenes remaining after CNT synthesis can be removed by irradiation in the presence of oxygen where the functionalized fullerenes combust. An alternate manner of removal of unreacted functionalized fullerenes is by washing with a solvent. Solvent compatibility of functionalized fullerenes is a major advantage for coating them on or incorporating them within various substrates. A transparent substrate (e.g., glass, polymer) coated on one side with functionalized fullerenes can be irradiated to form an aligned and uniform matrix of CNTs, which can be used within panels for displays or for other transparent electronic devices. Fabrication of other features (e.g., electrodes) in micro/nano electromechanical systems can also be formed.

The incorporation of CNTs polymer matrices is known to improve mechanical and electrical properties while maintaining reasonable optical properties of the polymeric composite. A major limitation associated with current techniques involves the dispersion of CNTs in the polymers. Functionalized fullerenes are soluble in polar solvents (e.g., polyhydroxy fullerenes (PHF) in water) as well as non-polar solvents (e.g., fullerene hydride in toluene), allowing dispersion in a carrier or matrix. In one embodiment of the invention, carbon nanotubes can be formed in a polymer matrix where functionalized fullerenes and a polymer are combined and the functionalized fullerenes are irradiated to yield CNTs within the matrix to form a CNT-polymer composite. The synthesis of CNTs by irradiation of functionalized fullerenes allows control of the size, type, graphitization, dispersion, alignment and precise positioning of nanotubes. CNT-polymer composites have a wide range of applications, including bullet-proof materials, conducting polymers, high-mechanical strength materials and transparent display panels. Additionally, irradiation of functionalized fullerenes in a polymer matrix can lead to formation of welded CNTs, which can further improve some properties of polymer composites.

Materials and Methods

Figures 2A, 2B:
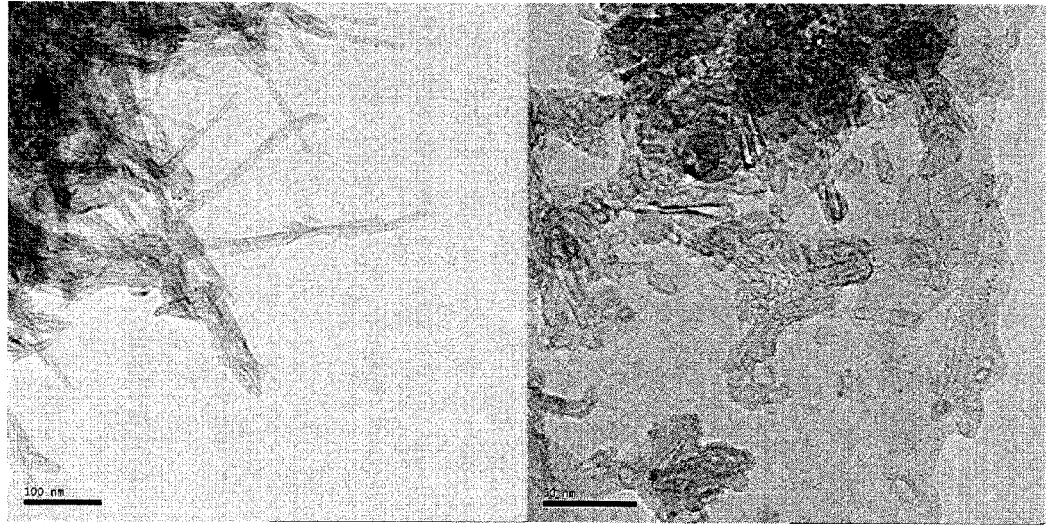
FIG. 2 shows high resolution transmission electron microscopy (HR-TEM) images of irradiated functionalized fullerenes showing (a) multi wall carbon nanotubes (MWNTs), (b) size distribution of MWNTs including carbon onions, and (c) carbon schwarzites.
Figure 2C:
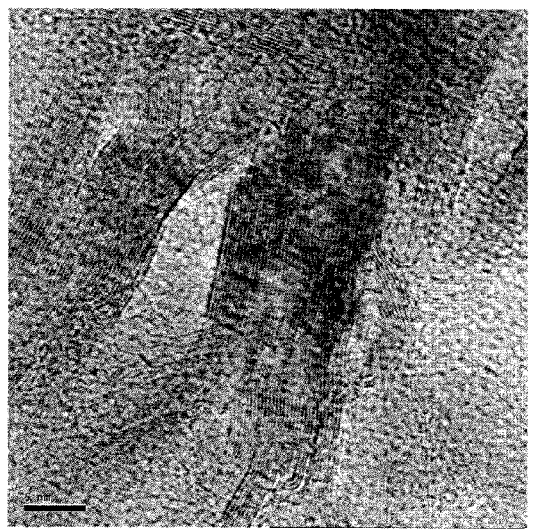
Figure 3:
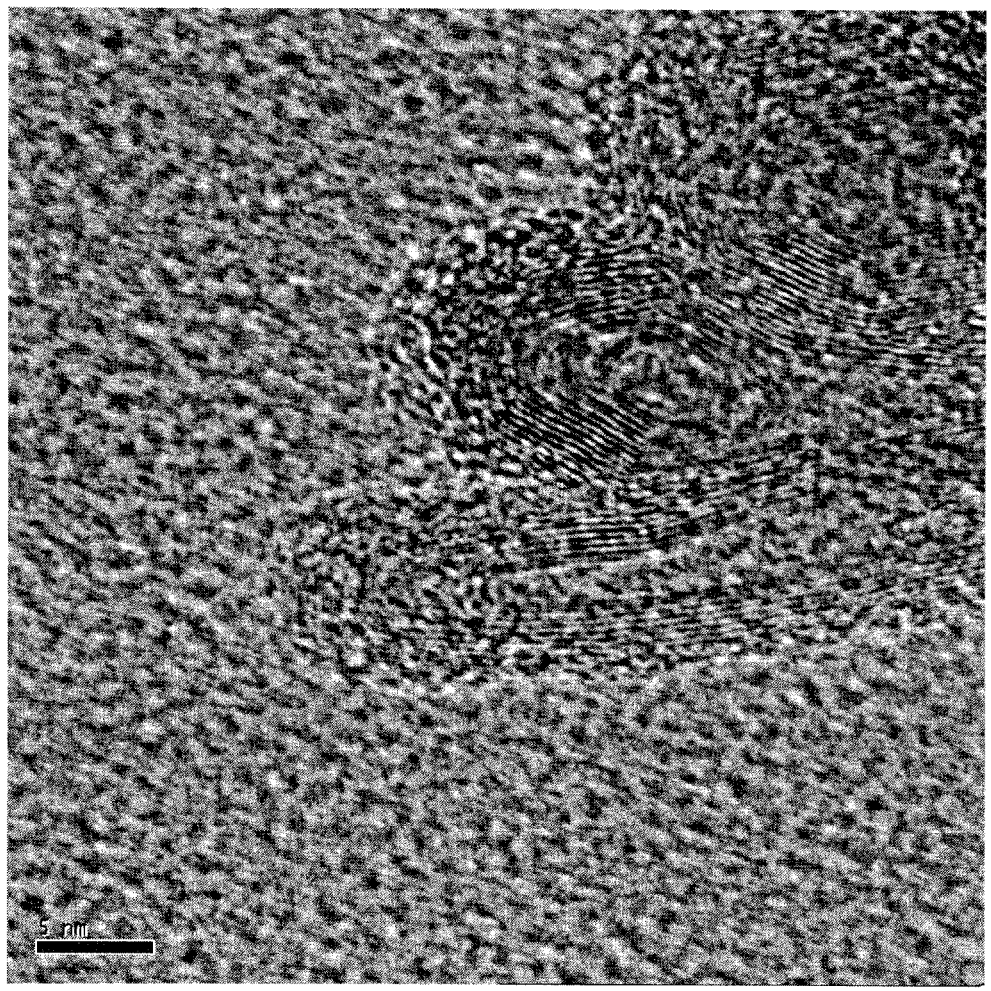
FIG. 3 shows a HR-TEM image of MWNTs with graphitized walls.
Figure 4:
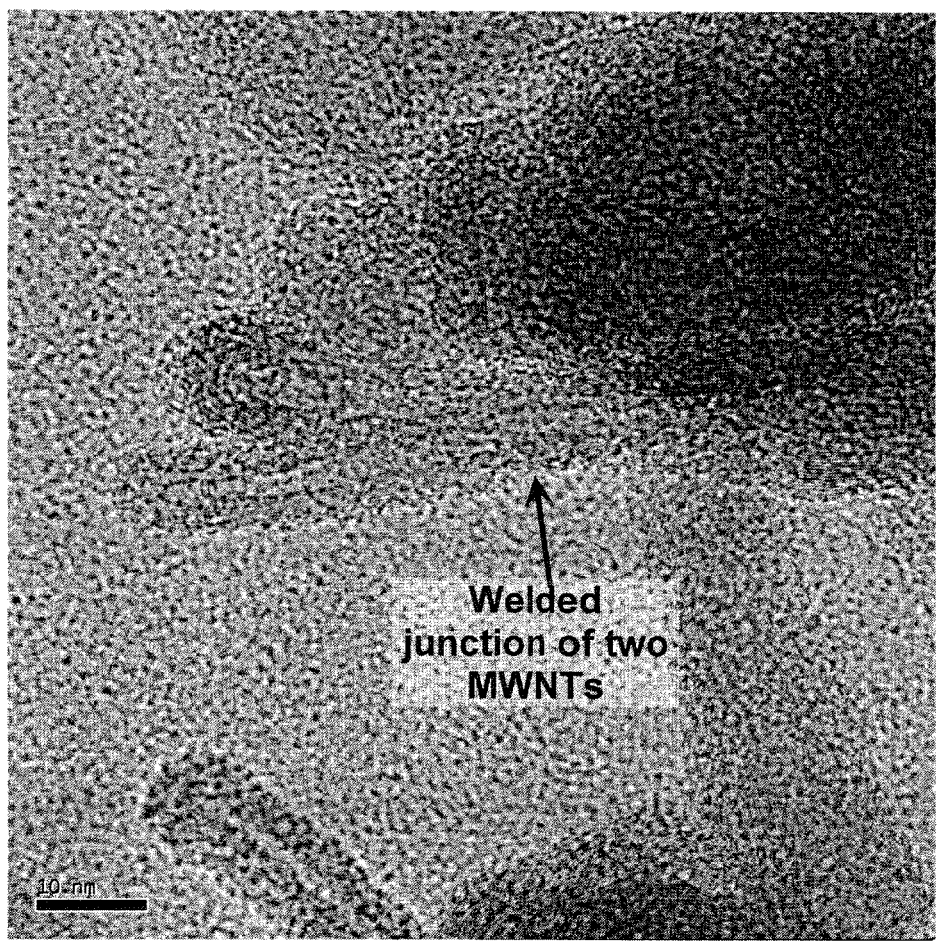
FIG. 4 shows a HR-TEM image of MWNTs with welded walls.

Polyhydroxy fullerenes (PHF) were coated on a silica wafer (1×1 cm). The coating was maintained for 24 hours under argon in a glove-box employing an oxygen trap. The oxygen-free PHF film was exposed to a 785 nm laser through an optical fiber (400 μm diameter). The output power of the laser was varied from 0.5-1.5 W. The irradiated area was somewhat greater than a circle of 400 μm diameter. Laser irradiation resulted in photoluminescence of the irradiated portion of PHF film. The photoluminescence intensity increased with laser intensity. The sample was irradiated at different positions on the wafer for up to 2 minutes at any single position. The wafer was placed in a Petri dish and the dish was sealed with parafilm while within the argon atmosphere of the glove-box. The PHF film (which was initially brown in color) was decorated with white and black features, as shown in FIG. 1. Black features were scraped from the film and imaged by high resolution transmission electron microscopy (HR-TEM). HR-TEM (up to 500,000× magnification) revealed that the black spots comprised MWNTs, carbon onions and carbon schwarzites as shown in FIG. 2. The MWNTs ranged from 2 nm to greater than 500 nm in length, as shown in FIG. 2. Higher resolution images revealed that the walls of the MWNTs are graphitized as shown in FIG. 3. Some of the MWNTs were welded together as shown in FIG. 4.

All patents, patent applications, provisional applications, and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application.

We claim:

1. A method of producing carbon nanostructures, consisting of the steps of:
   providing functionalized fullerenes in a matrix or a coating; and
   irradiating said functionalized fullerenes with electromagnetic radiation in an oxygen-free environment, wherein said functionalized fullerenes are converted into carbon nanostructures comprising carbon nanotubes, carbon nanohorns, carbon onions, diamonds, carbon schwarzites or any combinations thereof.

2. The method of claim 1, wherein said electromagnetic radiation is provided by a laser beam.

3. The method of claim 1, wherein said oxygen-free environment comprises a vacuum or a non-oxidizing gas atmosphere.

4. The method of claim 1, wherein said matrix comprises an organic solid, inorganic solid, polymer, polymer composite, metal, metal alloy, glass, ceramic, or any combination thereof.

5. The method of claim 1, wherein said functionalized fullerenes comprise endohedral fullerenes, substituted fullerenes, surface functionalized fullerenes or any mixture thereof.

6. The method of claim 5, wherein said functionalized fullerenes comprise said endohedral functionalized fullerenes and wherein said nanostructures comprise said carbon nanotubes having endohedral functionality.

7. The method of claim 1, wherein said functionalized fullerenes comprise fullerenes ($C_x$ where x is 20 to 1500) with side groups attached to said fullerenes by covalent bonds, ionic bonds, or Dewar coordination, Kubas interactions, or any combination thereof.

8. The method of claim 7, wherein said side groups comprise OH, Br, $H_2$, Gd, Ti, or $C(COOH)_2$.

9. The method of claim 1, wherein said carbon nanotubes comprise multi-wall carbon nanotubes.

10. The method of claim 1, wherein said carbon nanotubes comprise welded carbon nanotubes.

11. The method of claim 1, wherein said oxygen-free environment comprises a hydrogen atmosphere, and wherein said carbon nanostructures trap hydrogen.

* * * * *